(12) United States Patent
Kluge et al.

(10) Patent No.: US 7,890,078 B2
(45) Date of Patent: Feb. 15, 2011

(54) DUAL BAND WLAN COMMUNICATION FREQUENCY SYNTHESIZER TECHNIQUE

(75) Inventors: Wolfram Kluge, Dresden (DE); Sascha Beyer, Ottendorf-Okrilla (DE); Jeannette Zarbock, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 12/692,929

(22) Filed: Jan. 25, 2010

(65) Prior Publication Data

US 2010/0118854 A1    May 13, 2010

Related U.S. Application Data

(62) Division of application No. 11/158,785, filed on Jun. 22, 2005, now Pat. No. 7,653,361.

(30) Foreign Application Priority Data

Dec. 27, 2004    (DE) .................. 10 2004 062 827

(51) Int. Cl.
*H04B 1/26* (2006.01)
(52) U.S. Cl. .................. 455/323; 455/84; 455/3.02; 455/150.1; 455/12.1; 455/219; 455/132; 455/141; 455/131; 455/280; 375/257; 375/219; 370/316
(58) Field of Classification Search .......... 455/84, 455/323, 3.02, 150.1, 12.1, 562, 552, 553, 455/131, 280, 575, 132, 141, 219; 375/257, 375/219; 370/316
See application file for complete search history.

(56) References Cited

U.S. PATENT DOCUMENTS

| | | | |
|---|---|---|---|
| 6,999,716 B1* | 2/2006 | Andre et al. | 455/3.02 |
| 2004/0131127 A1 | 7/2004 | Nadiri | |
| 2004/0152436 A1 | 8/2004 | Masenten | |
| 2004/0259518 A1* | 12/2004 | Aktas et al. | 455/323 |

OTHER PUBLICATIONS

Translation of Official Communication in Application No. DE 10 2004 062 827.0 issued Aug. 6, 2010.
Translation into English of Office Action, May 18, 2005.
International search report application No. 10 2004 062 827.0-31 mailed Jun. 1, 2006.
Kummer, "Grundlagen der Mikrowellentechnik", VEB-Verlag Technik, Berlin, 1986, pp. 305-306.

\* cited by examiner

*Primary Examiner*—Matthew D Anderson
*Assistant Examiner*—April G Gonzales
(74) *Attorney, Agent, or Firm*—Meyertons, Hood, Kivlin, Kowert & Goetzel, P.C.

(57) ABSTRACT

A dual band WLAN (Wireless Local Area Network) communications technique is provided where a frequency synthesizer unit generates an LO (Local Oscillator) signal at a frequency between both frequency bands and two downconversion units and/or two upconversion units are provided. One of the units performs conversion between the LO signal and an IF (Intermediate Frequency) signal while the other conversion takes place between the IF signal and a zero-IF or low-IF signal. Signal processing is performed on the zero-IF or low-IF signal.

22 Claims, 4 Drawing Sheets

DUAL BAND WLAN COMMUNICATION FREQUENCY SYNTHESIZER TECHNIQUE

This application is a divisional of U.S. patent application Ser. No. 11/158,785 filed Jun. 22, 2005, now U.S. Pat. No. 7,653,361 issued Jan. 26, 2010 entitled "DUAL BAND WLAN COMMUNICATION FREQUENCY", which claims priority to foreign application no. 10 2004 062 827.0, filed in Germany on Dec. 27, 2004 entitled "DUAL BAND WLAN COMMUNICATION FREQUENCY SYNTHESIZER TECHNIQUE".

BACKGROUND OF THE INVENTION

1. Field of the Invention

The invention relates to WLAN (Wireless Local Area Network) communications devices and corresponding methods and in particular to the operation of dual band WLAN communications devices that operate at a frequency in one of two different frequency bands.

2. Description of the Related Art

A wireless local area network is a flexible data communications system implemented as an extension to or as an alternative for, a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to 802.11b that allows data rates of 5.5 and 11 Mbps in the 2.4 GHz spectrum. Further extensions exist.

Examples of these extensions are the IEEE 802.11a, 802.11b and 802.11g standards. The 802.11a specification applies to wireless ATM (Asynchronous Transfer Mode) systems and is primarily used in access hubs. 802.11a operates at radio frequencies between 5 GHz and 6 GHz. It uses a modulation scheme known as Orthogonal Frequency Division Multiplexing (OFDM) that makes possible data speeds as high as 54 Mbps, but most commonly, communications take place at 6 Mbps, 12 Mbps, or 24 Mbps. The 802.11b standard uses a modulation method known as Complementary Code Keying (CCK) which allows high data rates and is less susceptible to multi-path to propagation interference. The 802.11g standard can use data rates of up to 54 Mbps in the 2.4 GHz frequency band using OFDM. Since both 802.11g and 802.11b operate in the 2.4 GHz frequency band, they are completely inter-operable. The 802.11g standard defines CCK-OFDM as optional transmit mode that combines the access modes of 802.11a and 802.11b, and which can support transmission rates of up to 22 Mbps.

WLAN receivers, transmitters and transceivers, as well as other data communications devices, usually have a system unit that processes radio frequency (RF) signals. This unit is usually called front end.

Basically, a receiver side front end comprises RF filters, intermediate frequency (IF) filters, multiplexers, demodulators, amplifiers and other circuits that could provide such functions as amplification, filtering, conversion and more. Referring to FIG. 1, the front end usually includes an analog front end 100 which is the analog portion of a circuit, which precedes analog-to-digital conversion. Thus, the analog front end 100 performs some analog signal preprocessing in unit 110 and some other functions as described above, and then outputs the analog signal to an analog-to-digital converter 130. The quantized, i.e. digitized, output signal of the analog-to-digital converter 130 is then supplied to a digital signal processor 140.

As can be seen from FIG. 1, the analog front end 100 of conventional data communications receivers may further have a unit 120 for downconverting the received (and preprocessed) analog signal. Conventionally, RF carriers conveying data by way of some modulation technique are downconverted from the high frequency carrier to some other intermediate frequency through a process called mixing. Following the mixing process, the baseband signal is recovered through some type of demodulation scheme.

Receiver architectures exist where unit 120 has zero-IF and/or low-IF topology. This will now be explained in more detail with reference to FIGS. 2 and 3.

FIG. 2 is a simplified diagram illustrating the zero-IF approach for integrated receivers. In the zero-IF approach, the incoming signal, which is at radio frequency, is converted by mixer 200 directly to baseband (BB). Such direct conversion architectures have simplified filter requirements and can be integrated in a standard silicon process, making this design potentially attractive for wireless applications. However, there may be problems with the DC offset, IQ mismatch and with low frequency noise.

FIG. 3 illustrates the low-IF approach. As can be seen, the low-IF architecture operates at an intermediate frequency close to the baseband (like the zero-IF approach) and can therefore be integrated like the zero-IF circuits. However, there is a second downconverter 330 to convert the IF signals to baseband. Low-IF devices can avoid the problems of DC offset, IQ mismatch and low frequency noise but may require additional image rejection. For this reason, an image rejection unit 320 is added in the low-IF topology.

While FIGS. 1 to 3 have been discussed to refer to the receiver side, the transmitter side may be similarly discussed referring to FIGS. 4 to 6. A transmitter side front end comprises RF filters, IF filters, multiplexers, modulators, amplifiers, and other circuits that may provide such functions as amplification, filtering, conversion and more. Referring to FIG. 4, the front end usually includes a digital front end 400 which is the digital portion of a circuit which precedes digital-to-analog conversion. Thus, the digital front end 400 performs some digital signal processing and then outputs the digital signal to a digital-to-analog converter 410. The converted, i.e., analog, output signal of the digital-to-analog converter 410 is then supplied to an analog front end 420.

As can be seen from FIG. 4, the analog front end 420 may have a unit 430 for upconverting the analog signal received from the digital to analog converter 410. Conventionally, baseband carriers conveying data by way of some modulation technique are upconverted from baseband to some other intermediate frequency through a process called mixing. Following the mixing process, the IF signal is further upconverted to an RF frequency in the desired transmission frequency band and is further processed, e.g., filtered or amplified, in unit 440.

FIG. 5 is a simplified diagram illustrating the zero-IF approach for integrated transmitters, and FIG. 6 illustrates the low-IF approach. As can be seen, the low-IF architecture operates at an intermediate frequency close to the baseband (like the zero-IF approach). Further, there are two upconverters 600 and 610 to convert the baseband frequency signals to intermediate frequency and then from intermediate frequency to the transmission RF frequency. Moreover, an LO-feedthrough cancellation unit 620 is added in the low-IF topology. The zero-IF and low-IF approaches shown in FIGS. 5 and 6 have the same or similar characteristics and problems as discussed above with reference to FIGS. 2 and 3.

Another problem with communications devices that operate in a zero-IF or low-IF approach is that the LO signal frequency for up- and downconversion is at the center of the received/transmitted frequency bands. A VCO (Voltage Controlled Oscillator) frequency synthesizer running at this frequency therefore suffers from VCO pulling which significantly degrades the signal quality.

A conventional LO architecture that provides a signal at an output frequency with reduced pulling effect is described in US 2002/0180538 A1. A VCO generates a first signal having a frequency that is a fraction of the output frequency, and a frequency shifter generates a second signal with a frequency substantially equal to the difference between the VCO frequency and the output frequency. Single-sideband mixers are used to produce output signals at the sum of the VCO frequency and the shifted frequency while suppressing an unwanted sideband at the difference of the two frequencies.

While this technique may be suitable for reducing the pulling effect in conventional communications devices, the architecture may have some disadvantages when being applied to dual band WLAN devices. This is in particular because due to the increased number of component parts, the die size and consequently the manufacturing costs are increased. Further, the conventional techniques suffer from power consumption which is sometimes found to be a severe detriment when designing WLAN devices.

SUMMARY OF THE INVENTION

A dual band WLAN communications technique is provided that may allow for reducing manufacturing costs, improving circuit density by reducing the number of component parts and thus the die size, improving the efficiency and operating range, and/or reducing the power consumption.

In an embodiment, a dual band WLAN communications device is provided that is capable of receiving and processing an input signal at a frequency in one of two different frequency bands. The dual band WLAN communications device comprises a frequency synthesizer unit that is adapted to generate an LO signal at a frequency between a first frequency band of the two different frequency bands and a second frequency band of the two different frequency bands. The device further comprises a first downconversion unit that is connected to receive the input signal and the LO signal and generate an IF signal therefrom and a second downconversion unit that is connected to receive the IF signal and generate a zero-IF or low-IF signal therefrom. The device further comprises a single processing unit that is adapted to perform signal processing on the zero-IF or low-IF signal.

In another embodiment, there is provided a dual band WLAN communications device that is capable of transmitting an output signal at a frequency of one of two different frequency bands. The dual band WLAN communications device comprises a signal processing unit which is adapted to perform signal processing on a zero-IF or low-IF signal, a first upconversion unit which is connected to receive the processed zero-IF or low-IF signal and generate an IF signal therefrom, and a frequency synthesizer unit which is adapted to generate an LO signal at a frequency between a first frequency band of the two different frequency bands and a second frequency band of the two different frequency bands. The device further comprises a second upconversion unit which is connected to receive the IF signal and the LO signal and generate the output signal therefrom.

According to a further embodiment, a method of operating a dual band WLAN communications device to receive and process an input signal at a frequency of one of two different frequency bands comprises generating an LO signal at a frequency between a first frequency band of the two different frequency bands and a second frequency band of the two different frequency bands, downconverting the input signal using the LO signal to generate an IF signal, downconverting the IF signal to generate a zero-IF or low-IF signal, and performing signal processing on the zero-IF or low-IF signal.

In still a further embodiment, there is provided a method of operating a dual band WLAN communications device to transmit an output signal at a frequency in one of two different frequency bands. The method comprises performing signal processing on a zero-IF or low-IF signal, upconverting the processed zero-IF or low-IF signal to generate an IF signal, generating an LO signal at a frequency between a first frequency band of the two different frequency bands and a second frequency band of the two different frequency bands, and upconverting the IF signal using the LO signal to generate the output signal.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
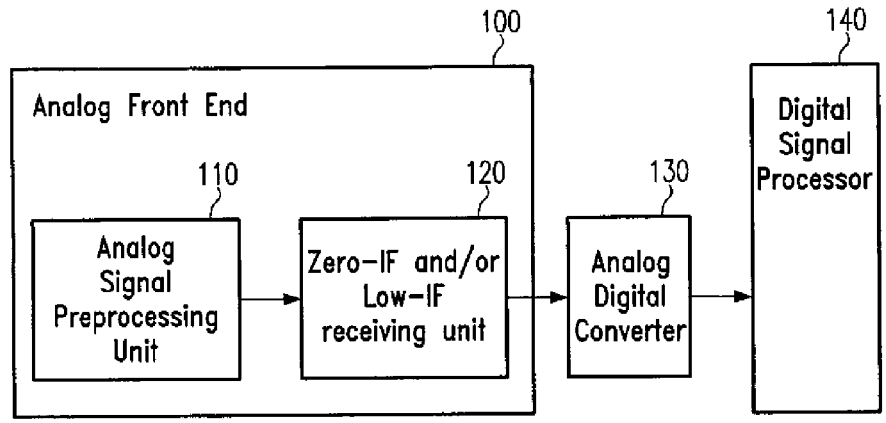
FIG. 1 is a block diagram illustrating the front end of a conventional data communications receiver.
Figure 2:
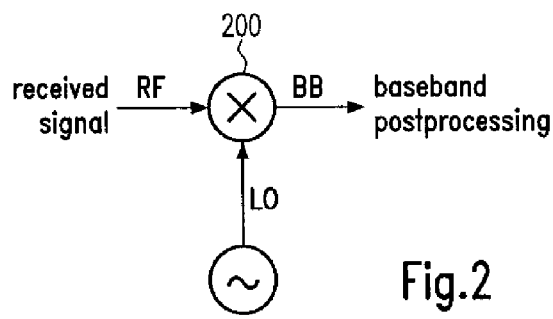
FIG. 2 is a simplified diagram illustrating a zero-IF approach in the receiver of FIG. 1.
Figure 3:
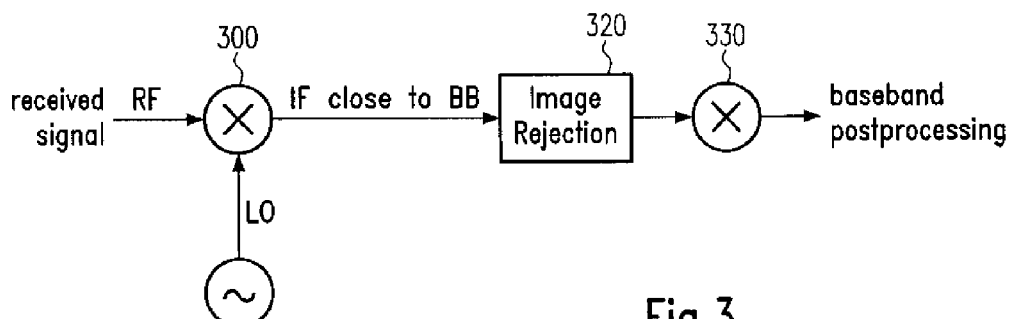
FIG. 3 is a simplified diagram illustrating a low-IF approach in the receiver of FIG. 1.
Figure 4:
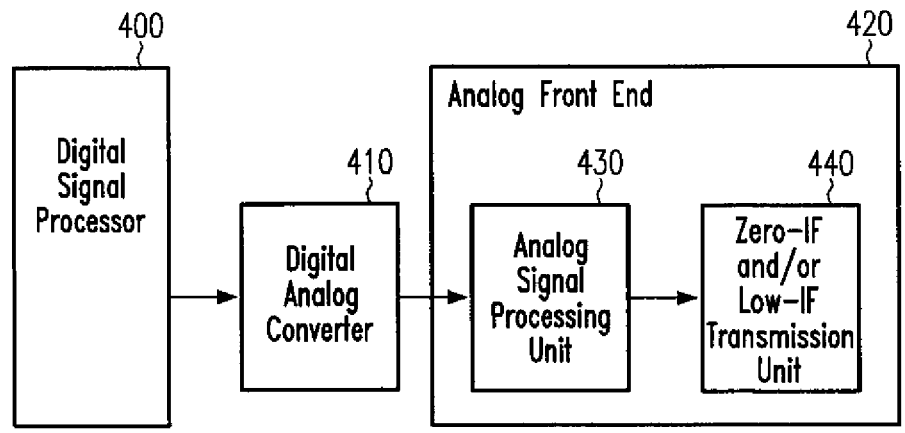
FIG. 4 is a block diagram illustrating the front end of a conventional data communications transmitter.
Figure 5:
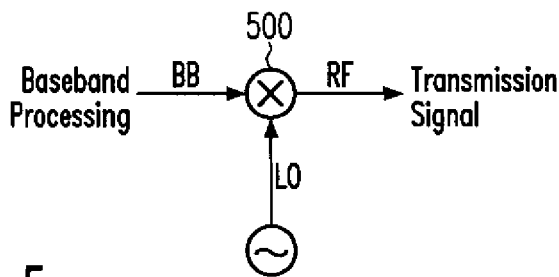
FIG. 5 is a simplified diagram illustrating a zero-IF approach in the transmitter of FIG. 4.
Figure 6:
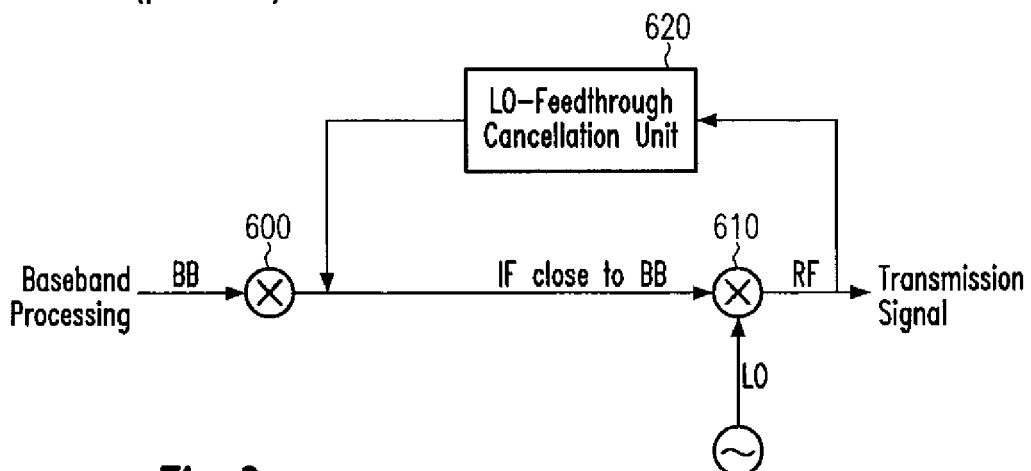
FIG. 6 is a simplified diagram illustrating a low-IF approach in the transmitter of FIG. 4.
Figure 7:
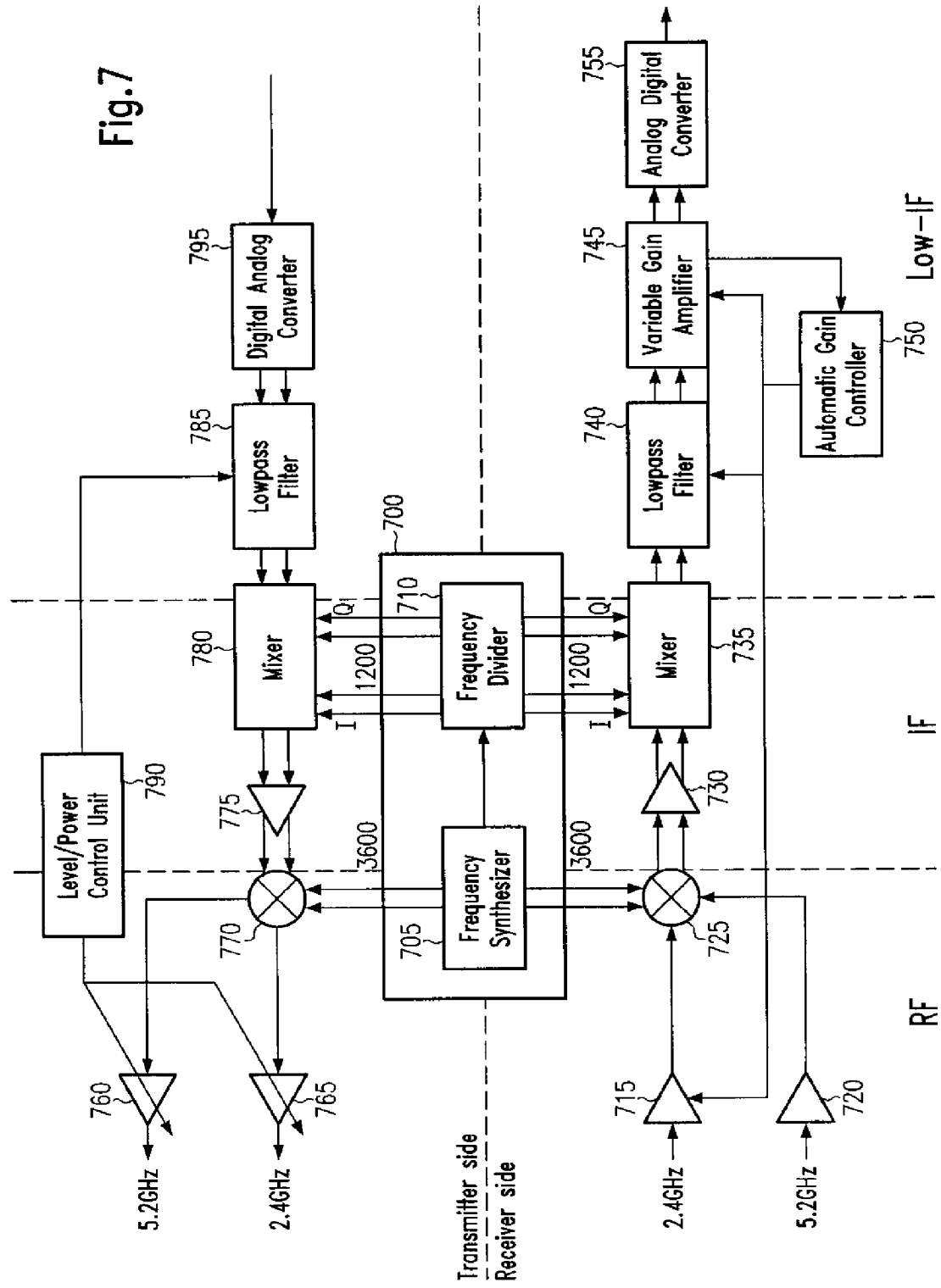
FIG. 7 is a block diagram illustrating a dual band WLAN communications device according to an embodiment.

Referring now to FIG. 7, a dual-band transceiver frequency conversion scheme is shown according to an embodiment. As can be seen from FIG. 7, the transceiver device has a receiver side in the lower part of the figure and a transmitter side in the upper part. Further, there is an LO signal generation unit 700 which may work for both the receiver and transmitter sides.

It can further be seen from FIG. 7 that the architecture can be divided into an RF region, an IF region and a low-IF region. The RF region deals with communications signals in the radio frequency range. As the communications device of FIG. 7 is a dual band WLAN device, the RF signals may have frequencies in one of two different frequency bands.

The IF region deals with intermediate frequency signals at a frequency which does not depend on the frequency band used in the RF region. Similarly, the low-IF region performs signal processing on low-IF signals irrespective of the frequency band of the RF signal.

As mentioned, the transceiver topology of FIG. 7 relates to a dual band transceiver that is capable of operating in one of two different frequency bands. The LO signal generation unit 700 comprises a frequency synthesizer 705 that may have a VCO unit to generate a first LO signal. The VCO frequency is situated in between the two frequency bands.

For instance, where the two frequency bands are at about 2.4 GHz and 5.2 GHz, respectively, the first LO frequency may be at about 3.6 GHz. Thus, the VCO oscillates far away from the frequency that is used for transmission and reception. This has the advantageous consequence that no pulling occurs.

In each of the receiver and transmitter sides, a mixer 725, 770 receives the first LO signal to perform downconversion or upconversion, respectively. In detail, the mixer 725 works as downconversion unit to convert the signals from both frequency bands to one IF signal. At the transmitter side, the mixer 770 performs upconversion on the IF signal to generate an RF signal in either one of the two frequency bands.

As may be further seen from FIG. 7, there is a second conversion stage to generate a low-IF signal from the IF signal at the receiver side, or to generate the IF signal from the low-IF at the transmitter side. For this purpose, additional mixers 735, 780 are provided to perform another downconversion or upconversion respectively.

The mixers 735, 780 receive a second LO signal from the LO signal generation unit 700 to perform the conversion. As can be seen from FIG. 7, the second LO signal may be generated from the VCO signal obtained from the frequency synthesizer 705 by performing frequency division. For instance, if the first LO signal was at 3.6 GHz, the frequency division may be a division by three so that the second LO signal has a frequency of 1.2 GHz. It is noted that other embodiments exist where the frequency divider 710 divides the frequency of the VCO signal by an integer value different from three.

Thus, there is only one VCO and PLL (Phase Locked Loop) frequency synthesizer needed to perform the two-stage conversion of both sides. This reduces the number of transceiver blocks needed, and thus reduces the die size and consequently the manufacturing costs. Further, the current consumption is reduced, leading to an improved power design.

It is further noted that the architecture shown in FIG. 7 does not require dedicated units to generate LO signals for each frequency band. The only blocks dedicated to the frequency bands at transmission or reception are the amplifiers 715, 720, 760, 765 in the RF region. In an embodiment, these amplifiers may be LNA (Low Noise Amplifier) units.

As may be further seen from FIG. 7, the amplifiers 760, 765 of the transmitter side RF region may be controlled by the level/power control unit 790 which may also control a low pass filter 785 in the low-IF region. Thus, the transmitter side signal processing in the low-IF region and the frequency band specific amplification in the RF region may be controlled in a correlated manner, thereby increasing the operational efficiency and overall signal quality.

Similarly, the receiver side comprises an automatic gain controller 750 in the low-IF region that may provide control signals to the low pass filter 740 and the variable gain amplifier 745 in the low-IF region, as well as a control signal to an amplifier 715 in the RF region. This likewise allows for controlling RF signal amplification and low-IF signal processing in a correlated manner. While FIG. 7 shows that only one of the receiver side amplifiers is controlled by the automatic gain controller 750, other embodiments exist where both amplifiers or the amplifier of the other frequency band is controlled. Further, embodiments exist where the amplifier control is temporarily or persistently disabled.

Similarly, while amplifiers 760 and 765 are both shown to be controlled by the level/power control unit 790, other embodiments may control only one of the amplifiers, or may have even this control disabled.

Referring to the IF region shown in FIG. 7, an additional amplifier 730, 775 may be located between both downconverting mixers 725, 735 or both upconverting mixers 770, 780 respectively. These amplifiers 730, 775 operate at the IF signal frequency and may be suitable for adjusting the power level in an appropriate manner, perform impedance matching, and/or serve for decoupling the respective mixers.

While the embodiment of FIG. 7 has been discussed to perform signal processing in the low-IF range, other embodiments exist where a zero-IF approach is used instead or in addition to the low-IF approach.

Further, while the embodiment of FIG. 7 relates to a transceiver device, that has both receiver and transmitter capabilities, other embodiments may relate to dedicated dual band WLAN receivers or transmitters respectively.

In the embodiments discussed above, communications are performed in accordance with the IEEE 802.11a and 802.11g specifications. It is however noted that other embodiments may make use of two frequency bands in accordance with other WLAN techniques.

Figure 8:
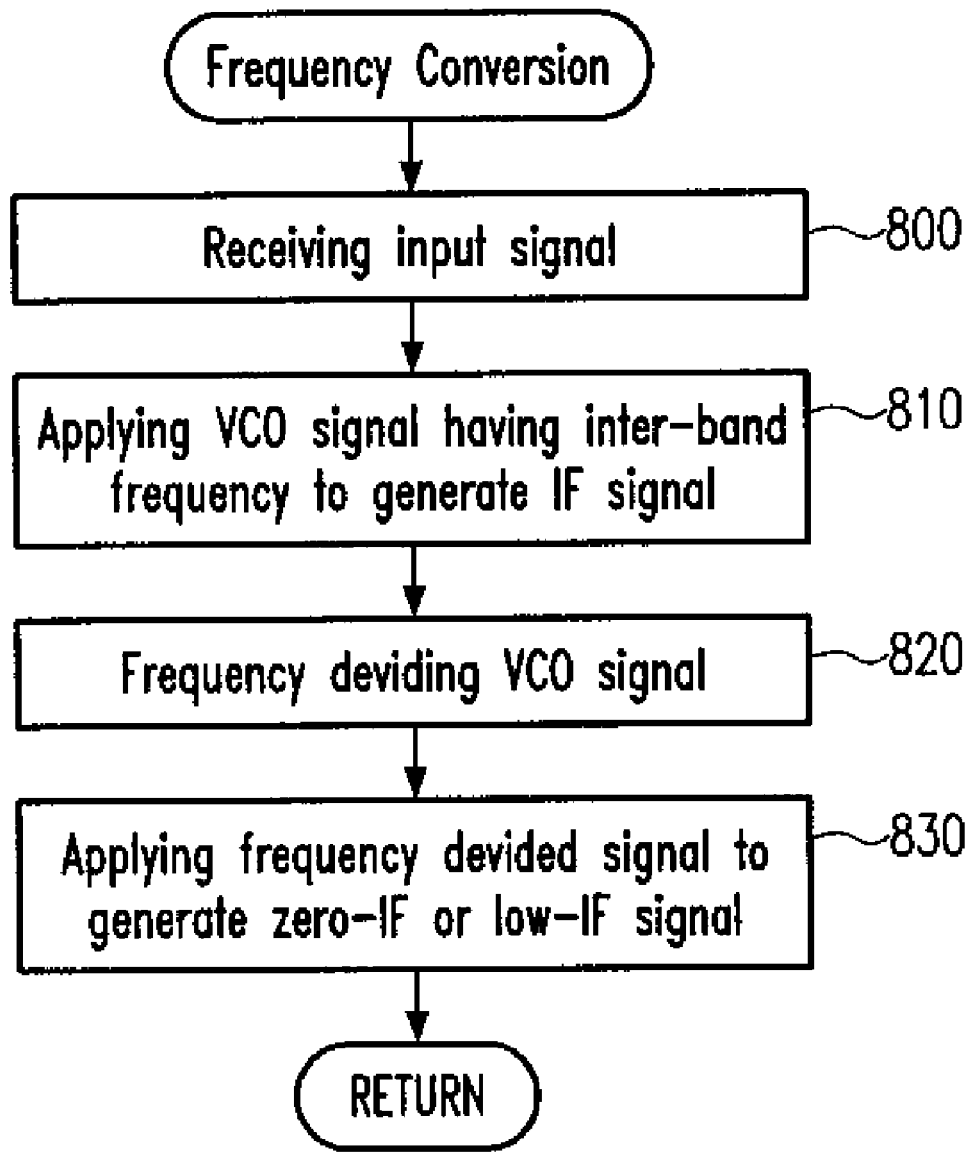
FIG. 8 is a flowchart illustrating a frequency conversion process according to an embodiment.

Referring now to FIG. 8, a flowchart is shown illustrating a frequency conversion process according to an embodiment. In step 800, an RF input signal is received at one of the amplifiers 715, 720. A VCO signal generated in a frequency synthesizer 705 of the LO signal generation unit 700 is then applied to the received input signal by means of mixer 725 to generate an IF signal in step 810, the VCO signal is then used to generate a second LO signal by performing frequency division in unit 710. The frequency divided signal is then applied to the (amplified) IF signal by means of mixer 735 to generate a zero-IF or low-IF signal in step 830. This signal is then subjected to further signal processing such as low-pass filtering, amplification and analog-to-digital conversion. A similar process may take place at the transmitter side of the dual band communication device according to the embodiment.

As apparent from the foregoing description of the various embodiments, a dual band WLAN communications technique is provided that applies a two-stage downconversion and/or upconversion using only one frequency synthesizer. Thus, only one VCO unit is needed for operating both conversion stages and dealing with both the transmitter and receiver side. The VCO signal is chosen to be at an inter-band frequency thereby avoiding the signal degradation due to VCO pulling. In an embodiment, the VCO frequency, i.e., the first LO signal frequency, is chosen to be near the center frequency between both frequency bands. It is however noted that there may be no strict requirement to choose the VCO frequency to be exactly at the center.

The second LO signal frequency is generated in the embodiments by performing frequency division on the VCO signal. This again reduces the number of component parts and thus the power consumption.

In the embodiments described above, the two-stage dual band WLAN conversion scheme of the embodiments may be implemented in the analog front end of the communications device, thereby avoiding the need to perform complex digital signal processing.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein.

Accordingly, it is to be understood that the invention is not to be limited by the specific illustrative embodiments, but only by the scope of the appended claims.

What is claimed is:

1. A dual band WLAN (Wireless Local Area Network) communications device capable of transmitting an output signal at a frequency in one of two different frequency bands, comprising:
    a signal processing unit adapted to perform signal processing on a zero-IF or low-IF signal;
    a frequency synthesizer unit adapted to generate a first LO (Local Oscillator) signal at a frequency between a first frequency band of said two different frequency bands and a second frequency band of said two different frequency bands;
    a frequency divider unit connected to said frequency synthesizer unit to generate a second LO signal by dividing the frequency of said first LO signal by a predefined value;
    a first upconversion unit connected to receive the processed zero-IF or low-IF signal and further connected to receive said second LO signal from said frequency divider unit, the first upconversion unit being configured to generate an IF (Intermediate Frequency) signal by applying the second LO signal received from said frequency divider unit to the processed zero-IF or low-IF signal; and
    a second upconversion unit connected to receive said IF signal and said first LO signal and generate said output signal therefrom.

2. The dual band WLAN communications device of claim 1, wherein said frequency synthesizer unit is adapted to generate said LO signal at a predefined frequency which is independent of whether the frequency of said output signal is in the first or second frequency band.

3. The dual band WLAN communications device of claim 2, wherein said LO signal is generated from a VCO (Voltage Controlled Oscillator) signal.

4. The dual band WLAN communications device of claim 1, wherein said predefined value is an integer value.

5. The dual band WLAN communications device of claim 4, wherein said integer value is three.

6. The dual band WLAN communications device of claim 1, capable of receiving an input signal at the frequency of said output signal, and further comprising:
    a first downconversion unit connected to receive said input signal and said LO signal and generate a reception IF signal therefrom; and
    a second downconversion unit connected to receive said reception IF signal and generate a reception zero-IF or low-IF signal therefrom.

7. The dual band WLAN communications device of claim 6, further comprising:
    a frequency divider unit connected to said frequency synthesizer unit to generate a second LO signal by dividing the frequency of said LO signal by a predefined value,
    wherein said first upconversion unit and said second downconversion unit are connected to said frequency divider unit to receive said second LO signal.

8. The dual band WLAN communications device of claim 1, further comprising a first amplifier and a second amplifier, the first amplifier being adapted to operate in said first frequency band, the second amplifier being adapted to operate in said second frequency band, wherein at least one of said first and second amplifiers is connected to be controlled by a power control unit.

9. The dual band WLAN communications device of claim 8, wherein said power control unit is further connected to said signal processing unit to control the signal processing performed by said signal processing unit.

10. The dual band WLAN communications device of claim 8, capable of receiving an input signal at the frequency of said output signal, and further comprising:
    a third amplifier and a fourth amplifier, the third amplifier being adapted to operate in said first frequency band, the fourth amplifier being adapted to operate in said second frequency band,
    wherein at least one of said third and fourth amplifiers are connected to said signal processing unit to be controlled by an AGC (Automatic Gain Control) unit of said signal processing unit.

11. A method of operating a dual band WLAN (Wireless Local Area Network) communications device to transmit an output signal at a frequency in one of two different frequency bands, comprising:
    performing signal processing on a zero-IF or low-IF signal;
    upconverting the processed zero-IF or low-IF signal to generate an IF (Intermediate Frequency) signal;
    generating a first LO (Local Oscillator) signal at a frequency between a first frequency band of said two different frequency bands and a second frequency band of said two different frequency bands;
    generating a second LO signal by dividing the frequency of said LO signal by a predefined value, wherein said zero-IF or low-IF signal upconversion uses said second LO signal; and
    upconverting said IF signal using said LO signal to generate said output signal.

12. The method of claim 11, wherein said LO signal is generated at a predefined frequency which is independent of whether the frequency of said output signal is in the first or second frequency band.

13. The method of claim 12, wherein said LO signal is generated from a VCO (Voltage Controlled Oscillator) signal.

14. The method of claim 11, wherein said predefined value is an integer value.

15. The method of claim 14, wherein said integer value is three.

16. The method of claim 11, adapted to receive an input signal at the frequency of said output signal, and further comprising:
    downconverting said input signal using said LO signal to generate a reception IF signal; and
    downconverting said reception IF signal to generate a reception zero-IF or lowIF signal.

17. The method of claim 16, further comprising:
generating a second LO signal by dividing the frequency of said LO signal by a predefined value,
wherein said zero-IF or low-IF signal upconversion and said reception IF signal downconversion use said second LO signal.

18. The method of claim 11, further comprising operating a first amplifier in said first frequency band and a second amplifier in said second frequency band, wherein at least one of said first and second amplifiers is controlled by a power control unit.

19. The method of claim 18, wherein said signal processing is controlled by said power control unit.

20. The method of claim 18, adapted to receive an input signal at the frequency of said output signal, and further comprising:

operating a third amplifier in said first frequency band and a fourth amplifier in said second frequency band, wherein at least one of said third and fourth amplifiers is controlled by an AGC (Automatic Gain Control) unit.

21. The method of claim 11, wherein said LO signal generation and said upconversion steps are performed by an analog front end of a dual band WLAN communications device, and said signal processing comprises performing digital-to-analog signal conversion.

22. The method of claim 11, adapted to be performed in accordance with the IEEE 802.11a and IEEE 802.11g specifications.

* * * * *